United States Patent
Eriguchi et al.

(10) Patent No.: US 7,538,177 B2
(45) Date of Patent: May 26, 2009

(54) CROSSLINKABLE FLUORINATED AROMATIC PREPOLYMER AND ITS USES

(75) Inventors: Takeshi Eriguchi, Chiyoda-ku (JP); Masahiro Ito, Chiyoda-ku (JP); Kaori Tsuruoka, Chiyoda-ku (JP); Yuichiro Ishibashi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/962,586

(22) Filed: Dec. 21, 2007

(65) Prior Publication Data

US 2008/0132669 A1  Jun. 5, 2008

Related U.S. Application Data

(63) Continuation of application No. PCT/JP2006/312056, filed on Jun. 15, 2006.

(30) Foreign Application Priority Data

Jun. 24, 2005  (JP) .............................. 2005-184611

(51) Int. Cl.
C08G 63/78 (2006.01)
C08G 63/87 (2006.01)

(52) U.S. Cl. ..................................... 528/205

(58) Field of Classification Search ............. 428/411.1; 524/611; 528/205
See application file for complete search history.

(56) References Cited

U.S. PATENT DOCUMENTS

| 5,114,780 A | 5/1992 | Mercer et al. |
| 5,115,082 A | 5/1992 | Mercer et al. |
| 5,155,175 A | 10/1992 | Mercer et al. |
| 5,173,542 A | 12/1992 | Lau et al. |
| 5,179,188 A | 1/1993 | Mercer et al. |
| 5,204,416 A | 4/1993 | Mercer et al. |
| 5,270,453 A | 12/1993 | Lau et al. |
| 5,959,157 A | 9/1999 | Lau et al. |
| 5,986,045 A | 11/1999 | Lau et al. |
| 6,188,458 B1 | 2/2001 | Tagusa et al. |
| RE37,599 E | 3/2002 | Lau et al. |
| 6,881,811 B2 | 4/2005 | Yokotsuka et al. |
| 2006/0173129 A1 | 8/2006 | Yokotsuka et al. |
| 2008/0132669 A1 | 6/2008 | Eriguchi et al. |

FOREIGN PATENT DOCUMENTS

| JP | 5-502257 | 4/1993 |
| JP | 9-90404 | 4/1997 |
| JP | 10-74750 | 3/1998 |
| JP | 10-247646 | 9/1998 |
| JP | 3064011 | 5/2000 |
| JP | 2002-356551 | 12/2002 |
| JP | 2003-217343 | 7/2003 |
| JP | 2003-231750 | 8/2003 |
| JP | 2005-105115 | 4/2005 |
| WO | WO 03/008483 A1 | 1/2003 |
| WO | WO 03/099915 A1 | 12/2003 |
| WO | WO 2007/119384 A1 | 10/2007 |

OTHER PUBLICATIONS

Hyung-Jong Lee, et al. "Crosslinkable Fluorinated Poly(arylene ethers) bearing Phenyl Ethynyl Moiety for Low-Loss Polymer Optical Waveguide Devices" Journal of Polymer Science: Part A: vol. 36, 1998, pp. 2881-2887.
U.S. Appl. No. 12/210,375, filed Sep. 15, 2008, Eriguchi, et al.
U.S. Appl. No. 12/277,598, filed Nov. 25, 2008, Ito, et al.

*Primary Examiner*—Terressa M Boykin
(74) *Attorney, Agent, or Firm*—Oblon, Spivak, McClelland, Maier & Neustadt, P.C.

(57) ABSTRACT

A crosslinkable fluorinated aromatic prepolymer which is capable of forming a cured product having high transparency, a low relative permittivity, high heat resistance, low birefringence and high flexibility, and which is obtained by subjecting a compound (Y-1) having a polymerizable double bond (A) and/or a phenolic hydroxyl group and a compound (Y-2) having a polymerizable double bond (A) and a fluorinated aromatic ring, to a condensation reaction in the presence of a HF-removing agent, with a particular fluorinated aromatic compound (B) and a compound (C) having at least 3 phenolic hydroxyl groups, the respective phenolic hydroxyl groups not being present in the same aromatic ring, and which has polymerizable double bonds (A) and ether bonds and has a number average molecular weight of from $1 \times 10^3$ to $5 \times 10^5$.

16 Claims, No Drawings

CROSSLINKABLE FLUORINATED AROMATIC PREPOLYMER AND ITS USES

TECHNICAL FIELD

The present invention relates to a crosslinkable fluorinated aromatic prepolymer and its uses.

BACKGROUND ART

An insulation film having a lower relative permittivity is required, as electronic devices, multilayer wiring boards, etc. are increasingly small-sized and highly integrated, and as displays of e.g. TFT are large-sized and become high-resolution. Further, as an optical material to be used for an optical transmission device such as an optical integrated circuit, an optical switching device or an optical-electrical consolidated substrate, a material having high light transmittance and low birefringence (dependency on polarization of refractive index), is required. Fluorinated aromatic polymers are now being studied to satisfy such requirements and to secure heat resistance of at least 250° C., preferably at least 300° C., which is required in the process for producing and/or mounting electronic devices, multilayer wiring boards or optical transmission devices.

As a fluorinated aromatic polymer, a fluorinated aromatic polymer having ether bonds (hereinafter referred to as a polyarylene ether or PAE) has been proposed (e.g. Patent Documents 1 to 3 and Non-Patent Document 1). Its relative permittivity is from about 2.5 to 2.9, and its application to an insulation film for electronic devices or multilayer wiring boards, is being studied. Further, its application to optical transmission devices is also being studied.

Further, PAE having a branched structure has been proposed which is produced by using a compound having at least three phenolic hydroxyl groups (e.g. Patent Document 4).

Further, PAE satisfying both low dielectric constant and high glass transition temperature (hereinafter referred to as Tg) has been proposed which is produced from a specific fluorinated aromatic compound having a branched structure (e.g. Patent Documents 5 and 6).

Further, a transmissive liquid crystal display device having an interlayer insulation film comprising a highly transparent fluorinated organic thin film has been proposed (e.g. Patent Document 7). Such an organic thin film is required to have high transparency, a low dielectric constant and high surface flatness so as to increase the aperture ratio.

Patent Document 1: Japanese Patent No. 3064011
Patent Document 2: U.S. Pat. No. 5,115,082
Patent Document 3: U.S. Pat. No. 5,959,157
Patent Document 4: JP-A-10-247646
Patent Document 5: WO03/008483
Patent Document 6: JP-A-2005-105115
Patent Document 7: JP-A-9-90404
Non-Patent Document 1: J. Polm. Sci.; Part A; Polm. Chem., vol. 36, 2881 (1998)

DISCLOSURE OF THE INVENTION

Problems that the Invention is to Solve

However, the above-described prior art has had the following problems.

PAE disclosed in Patent Documents 1 to 3 and Non-Patent Document 1, is a linear-chain polymer produced by using a compound having two phenolic hydroxyl groups, and its Tg is low and the heat resistance is inadequate. Tg can be increased by introducing crosslinkable functional groups to PAE, followed by crosslinking, but the relative permittivity will thereby be increased to a level of from 2.7 to 3.0. Thus, it is difficult to satisfy both low relative permittivity and high Tg. Further, the birefringence of such a polymer is about 0.007, which is low as compared with a polyimide or the like but is still inadequate as an optical transmission device.

Further, PAE having a branched structure as disclosed in Patent Document 4 has no crosslinkable functional group and thus is thermoplastic, whereby Tg can hardly be made to be at least 300° C.

Further, PAE produced from a specific fluorinated aromatic compound having a branched structure as disclosed in Patent Document 5 has a very bulky molecular structure and thus has a drawback that it is brittle and inferior in flexibility. Specifically, it has a drawback that particularly when a thick film is to be formed, cracking is likely to result in the coating film by a thermal stress.

Further, PAE produced from a specific fluorinated aromatic compound having a branched structure as disclosed in Patent Document 6 has insufficient transparency in some cases.

Further, Patent Document 7 fails to disclose a specific material satisfying all of a low relative permittivity, high heat resistance and high transparency.

The present invention has been made under the above-described circumstances, and it is an object of the present invention to provide a crosslinkable fluorinated aromatic prepolymer which is capable of forming a cured product having high transparency, a low relative permittivity, high heat resistance, low birefringence and high flexibility simultaneously, a coating composition containing it, a cured product formed by using such a prepolymer, and a cured film formed from the coating composition.

Means to Solve the Problems

In order to accomplish the above object, the present invention provides a crosslinkable fluorinated aromatic prepolymer which is obtained by subjecting either one or both of a compound (Y-1) having a polymerizable double bond (A) and a phenolic hydroxyl group and a compound (Y-2) having a polymerizable double bond (A) and a fluorinated aromatic ring, to a condensation reaction in the presence of a HF-removing agent, with a fluorinated aromatic compound (B) represented by the following formula (1):

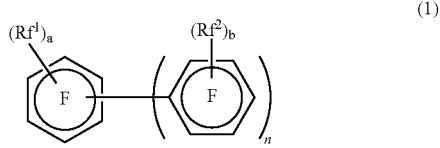

(wherein n is an integer of from 0 to 3, each of a and b which are independent of each other, is an integer of from 0 to 3, each of $Rf^1$ and $Rf^2$ which may be the same or different from each other, is a fluorinated alkyl group having at most 8 carbon atoms, and F in the aromatic ring represents that hydrogen atoms of the aromatic ring are all substituted by fluorine atoms), and a compound (C) having at least 3 phenolic hydroxyl groups, the respective phenolic hydroxyl groups not being present in the same aromatic ring, and which has polymerizable double bonds (A) and ether bonds and has a number average molecular weight of from $1 \times 10^3$ to $5 \times 10^5$.

Further, the present invention provides a cured product formed by curing the above crosslinkable fluorinated aromatic prepolymer.

Further, the present invention provides a coating composition comprising the above crosslinkable fluorinated aromatic prepolymer and a solvent.

Further, the present invention provides a cured film formed by forming a wet film of a crosslinkable fluorinated aromatic prepolymer on a substrate by using the above coating composition, and then, after removing the solvent in the wet film or at the same time as removing the solvent, curing the crosslinkable fluorinated aromatic prepolymer.

Further, the present invention provides an electric or electronic component and an optical transmission device, having the above cured film.

Effects of the Invention

The crosslinkable fluorinated aromatic prepolymer of the present invention is produced by using the compound (C) having at least three phenolic hydroxyl groups, the respective phenolic hydroxyl groups not being present in the same aromatic ring, and has polymerizable double bonds (A), whereby it is possible to form a cured film which satisfies high transparency, a low dielectric constant, low birefringence and high heat resistance simultaneously.

Further, the crosslinkable fluorinated aromatic prepolymer of the present invention is capable of forming a cured film excellent in flexibility, whereby it is possible to obtain a film strong against an external force such as bending, and it becomes easy to form a thick film.

Further, the cured film formed by curing the crosslinkable fluorinated aromatic prepolymer of the present invention satisfies all of a low relative permittivity, high heat resistance, low birefringence and high flexibility and is thereby applicable to an insulation film for electric or electronic components or an optical transmission device.

Further, the cured product formed by curing the crosslinkable fluorinated aromatic prepolymer of the present invention is excellent in applicability to insulation films for electronic devices and multilayer wiring boards, films and optical transmission devices. In such applications, it is possible to accomplish high performance in e.g. reduction of signal transmission delay time for an element and to gain high reliability by excellent mechanical properties in a high temperature region.

BEST MODE FOR CARRYING OUT THE INVENTION

The crosslinkable fluorinated aromatic prepolymer of the present invention (hereinafter referred to simply as the prepolymer) is characterized in that it is obtained by subjecting either one or both of a compound (Y-1) having a polymerizable double bond (A) and a phenolic hydroxyl group and a compound (Y-2) having a polymerizable double bond (A) and a fluorinated aromatic ring, to a condensation reaction in the presence of a HF-removing agent, with a fluorinated aromatic compound (B) represented by the following formula (1):

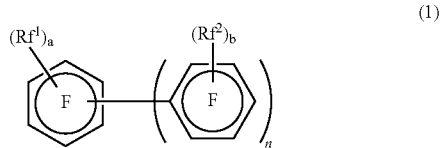

(1)

(wherein n is an integer of from 0 to 3, each of a and b which are independent of each other, is an integer of from 0 to 3, each of $Rf^1$ and $Rf^2$ which may be the same or different from each other, is a fluorinated alkyl group having at most 8 carbon atoms, and F in the aromatic ring represents that hydrogen atoms of the aromatic ring are all substituted by fluorine atoms), and a compound (C) having at least 3 phenolic hydroxyl groups, the respective phenolic hydroxyl groups not being present in the same aromatic ring, and it has polymerizable double bonds (A) and ether bonds and has a number average molecular weight of from $1 \times 10^3$ to $5 \times 10^5$.

The prepolymer of the present invention is produced by using the compound (C) having at least three phenolic hydroxyl groups, the respective phenolic hydroxyl groups not being present in the same aromatic ring, and has polymerizable double bonds (A), whereby it is possible to obtain a cured product (a fluorinated aromatic polymer) satisfying high transparency, a low dielectric constant, low birefringence and high heat resistance simultaneously. Namely, by using the compound (C) having at least three phenolic hydroxyl groups, the respective phenolic hydroxyl groups not being present in the same aromatic ring, it is possible to introduce branched structures to the polymer chain to make the molecular structure three dimensional thereby to increase the free volume of the polymer, whereby low densification i.e. a low dielectric constant can be accomplished. Further, usually, a linear chain polymer having aromatic rings is likely to undergo orientation of molecules due to stacking of aromatic rings. Whereas, with the cured product of the present invention, orientation of molecules is suppressed by the introduction of branched structures, and consequently, the birefringence will be small. Further, by selecting a specific molecular structure, coloring of the prepolymer and the cured product is suppressed, and high transparency will be achieved.

By the presence of the polymerizable double bonds (A), in the obtainable cured product, a crosslinking or chain-extending reaction among prepolymer molecules can be promoted, and consequently, the heat resistance will be substantially be improved. At the same time, there is an effect such that the solvent resistance of the cured product will be improved.

Further, by the use of the fluorinated aromatic compound (B) represented by the above formula (1), it is possible to obtain a cured product having excellent flexibility. As compared with a fluorinated aromatic polymer produced from a fluorinated aromatic compound having a branched structure in itself, it is possible to increase the density of ether bonds, whereby flexibility of the main chain will be improved, and consequently, it is possible to obtain a cured product having excellent flexibility. The flexibility being excellent is advantageous particularly when the cured product is in the form of a cured film.

In the present invention, the fluorinated aromatic compound (B) is a fluorinated aromatic compound represented by the above formula (1). In this formula (1), each of $Rf^1$ and $Rf^2$ is a fluorinated alkyl group having at most 8 carbon atoms. From the viewpoint of the heat resistance, a perfluoroalkyl group is preferred. As a specific example, a perfluoromethyl group, a perfluoroethyl group, a perfluoropropyl group, a perfluorobutyl group, a perfluorohexyl group or a perfluorooctyl group may be mentioned. Further, an "a" number of $Rf^1$'s and a "n×b" number of $Rf^2$'s may be the same or different.

If the number of $Rf^1$ or $Rf^2$ increases, it tends to be difficult to produce the fluorinated aromatic compound (B). Accordingly, the number (a or n×b) of $Rf^1$ or $Rf^2$ is independently preferably from 0 to 2, most preferably 0. The fluorinated aromatic compound (B) is preferably perfluorobenzene, perfluorotoluene, perfluoroxylene, perfluorobiphenyl, perfluoroterphenyl, perfluoro(1,3,5- or 1,2,4-)triphenylbenzene or perfluoroquaterphenyl, particularly preferably perfluorotoluene, perfluorobiphenyl or perfluoro-1,3,5-triphenylbenzene. These compounds may be used alone or in combination as a mixture of two or more of them. As the fluorinated aromatic compound (B), perfluorobiphenyl or perfluoro-1,3,5-triphenylbenzene is most preferred, since the cured product thereby obtainable will be excellent in the balance of the dielectric constant and the heat resistance, and the flexibility of the cured product will be high.

In the present invention, the compound (C) having at least three phenolic hydroxyl groups, the respective phenolic hydroxyl groups not being present in the same aromatic ring, is preferably a polyfunctional phenol. As the compound (C), a compound having a polymerizable double bond (A) is excluded. As a specific example, 1,1,1-tris(4-hydroxyphenyl) ethane, 1,2,4- or 1,3,5-tris(4-hydroxyphenyl)benzene or 1,1,2,2-tetrakis(4-hydroxyphenyl)ethane may, for example, be mentioned. As the compound (C), a compound having three phenolic hydroxyl groups, is preferred, since the flexibility of a cured film thereby obtainable will be high, and especially, 1,1,1-tris(4-hydroxyphenyl)ethane is most preferred, since the dielectric constant of a cured product thereby obtainable will be low and transparency of the cured product thereby obtainable will be high.

The prepolymer of the present invention contains polymerizable double bonds (A). Such polymerizable double bonds (A) are reactive functional groups which do not substantially undergo a reaction during the production of the prepolymer and which undergo a reaction when an external energy is given at the time of preparing a cured product such as a coating, a film or a molded product or at an optional point of time after the preparation, to induce crosslinking or chain extension among prepolymer molecules.

As the external energy, heat, light, electron beams, etc. or a combination thereof is preferred in view of the excellent applicability to the production of electronic devices, multilayer wiring boards or optical transmission devices and/or to the mounting process. In a case where heat is employed as the external energy, reactive functional groups which react at a temperature of from 40° C. to 500° C. are preferred. If the reactive temperature is too low, the stability cannot be secured during the storage of the prepolymer or a coating composition containing the prepolymer, and if it is too high, the prepolymer itself tends to undergo heat decomposition during the reaction. Accordingly, the temperature for the reaction is preferably within the above range, more preferably from 60° C. to 400° C., most preferably from 70° C. to 350° C. In a case where light is employed as the external energy, it is also preferred to incorporate a photo radical initiator, a photo acid generator, a sensitizer, etc. to the prepolymer or to the after-mentioned coating composition containing the prepolymer. Further, polymerizable double bonds (A) containing no polar groups will not increase the relative permittivity of a cured film, and it is preferred to employ polymerizable double bonds (A) containing no polar groups, especially when the prepolymer of the present invention is employed for the production of an insulation film.

Specific examples of the polymerizable double bonds (A) include, for example, vinyl groups, allyl groups, methacryloyl(oxy) groups, acryloyl(oxy) groups, vinyloxy groups, trifluorovinyl groups, trifluorovinyloxy groups, 1-oxocyclopenta-2,5-diene-3-yl groups and hydroxyfluorenyl groups. The methacryloyl(oxy) groups mean methacryloyl groups or methacryloyloxy groups, and the same applies to the acryloyl (oxy) groups. Vinyl groups, methacryloyl(oxy) groups, acryloyl(oxy) groups or trifluorovinyloxy groups are preferably employed, since the reactivity is high, and a high crosslinking density can be obtained. Vinyl groups, methacryloyl(oxy) groups or acryloyl(oxy) groups are particularly preferred, since a cured product thereby obtainable will have excellent heat resistance. Further, vinyl groups are most preferred, since the temperature at which the prepolymer is cured can be decreased.

The content of the polymerizable double bonds (A) in the prepolymer of the present invention is such that the polymerizable double bonds (A) are preferably from 0.1 to 4 mmol, more preferably from 0.2 to 3 mmol, particularly preferably from 0.8 to 3 mmol, per gram of the prepolymer. When the content is at least 0.1 mmol, heat resistance and solvent resistance of a cured product can be increased, and when it is at most 4 mmol, increase of the relative permittivity is likely to be suppressed.

The prepolymer of the present invention may be produced by either one or both of the following methods (i) and (ii).

(i) A method wherein the fluorinated aromatic compound (B) represented by the above formula (1), the compound (C) having at least three phenolic hydroxyl groups, the respective phenolic hydroxyl groups not being present in the same aromatic reing, and the compound (Y-1) having a polymerizable double bond (A) and a phenolic hydroxyl group are subjected to a condensation reaction in the presence of a HF-removing agent.

(ii) A method wherein the fluorinated aromatic compound (B), the compound (C) having at least three phenolic hydroxyl groups, the respective phenolic hydroxyl groups being not present in the same aromatic ring, and the compound (Y-2) having a polymerizable double bond (A) and a fluorinated aromatic ring are subjected to a condensation reaction in the presence of a HF-removing agent.

Further, in a case where the prepolymer is produced by both of the above (i) and (ii), the fluorinated aromatic compound (B), the compound (C), the compound (Y-1) and the compound (Y-2) are subjected to a condensation reaction in the presence of a HF-removing agent.

In the above methods for producing the prepolymer, the condensation reaction proceeds as follows. As shown in the following formula (2), an ether bond will be formed by e.g. a reaction mechanism wherein a phenoxy group derived from a phenolic hydroxyl group will attack the carbon atom to which a fluorine atom of the fluorinated aromatic compound (B) is bonded, and then the fluorine atom will be detached.

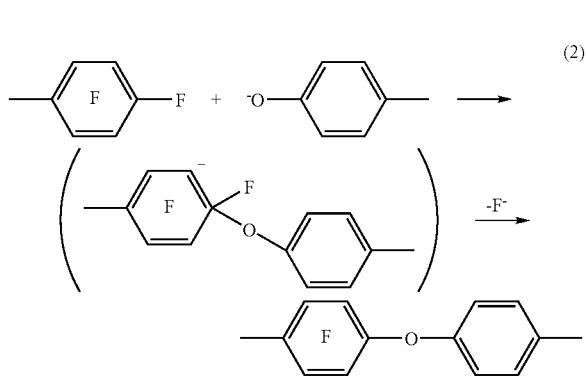

As the compound (Y-1) having a polymerizable double bond (A) and a phenolic hydroxyl group to be used in the method (i), a compound (Y-1-1) having one phenolic hydroxyl group and a compound (Y-1-2) having two phenolic hydroxyl groups, are preferred.

Specific examples of the compound (Y-1-1) having a polymerizable double bond (A) and one phenolic hydroxyl group include a phenol having a polymerizable double bond such as 4-hydroxystyrene. They may be used alone or in combination as a mixture of two or more of them. More preferred is an aromatic compound having a vinyl group as the polymerizable double bond (A).

Specific examples of the compound (Y-1-2) having a polymerizable double bond (A) and two phenolic hydroxyl groups include a bis(phenylethenyl)dihydroxybiphenyl such as 2,2'-bis(phenylethenyl)-5,5'-dihydroxybiphenyl or 2,2'-bis(phenylethenyl)-4,4'-dihydroxybiphenyl. They may be used alone or in combination as a mixture of two or more of them.

As the compound (Y-2) having a polymerizable double bond (A) and a fluorinated aromatic ring to be used in the method (ii), a compound having a polymerizable double bond (A) and a perfluoro aromatic ring such as perfluorophenyl or perfluorobiphenyl, is preferred. Its specific examples include a fluorinated aryl having a reactive double bond, such as pentafluorostyrene, pentafluorobenzyl acrylate, pentafluorobenzyl methacrylate, pentafluorophenyl acrylate, pentafluorophenyl methacrylate, perfluorostyrene, pentafluorophenyltrifluorovinyl ether and 3-(pentafluorophenyl)pentafluoro-1-propene. They may be used alone or in combination as a mixture of two or more of them. As the compound (Y-2), pentafluorostyrene is preferred, since the crosslinking reaction will thereby proceed at a relatively low temperature, and the heat resistance of a prepolymer cured product thereby obtained will be high.

As the HF-removing agent to be used for the production of the prepolymer of the present invention, a basic compound is preferred, and an alkali metal carbonate, hydrogen carbonate or hydroxide is particularly preferred. Specific examples include sodium carbonate, potassium carbonate, sodium hydrogen carbonate, potassium hydrogen carbonate, sodium hydroxide and potassium hydroxide.

With respect to the amount of the HF-removing agent to be used, in the method (i), it is required in an amount of at least equimolar, preferably from 1.1 to 3 times in a molar ratio to the total molar amount of phenolic hydroxyl groups in the compound (C) and the compound (Y-1). In the method (ii), it is required in an amount of at least equimolar, preferably from 1.1 to 3 times in a molar ratio to the molar amount of phenolic hydroxyl groups in the compound (C).

In the methods (i) and (ii), the condensation reaction is preferably carried out in a polar solvent. The polar solvent is preferably a solvent containing an aprotic polar solvent such as N,N-dimethylacetamide, N,N-dimethylformamide, N-methylpyrrolidone, dimethyl sulfoxide or sulfolane. To the polar solvent, toluene, xylene, benzene, tetrahydrofuran, benzotrifluoride, xylenehexafluoride or the like may be incorporated within a range not to deteriorate the solubility of the prepolymer to be formed or not to adversely affect the condensation reaction. By such incorporation, the polarity (the dielectric constant) of the solvent may be changed to control the reaction rate.

The condensation reaction conditions are preferably from 10 to 200° C. for from 1 to 80 hours, more preferably from 20 to 180° C. for from 2 to 60 hours, most preferably from 50 to 160° C. for from 3 to 48 hours.

The number average molecular weight of the prepolymer of the present invention is within a range of from $1 \times 10^3$ to $5 \times 10^5$, preferably from $1.5 \times 10^3$ to $1 \times 10^5$. Within this range, the coating properties of the after-mentioned coating composition containing such a prepolymer will be good, and the resulting cured film will have good heat resistance, mechanical properties, solvent resistance, etc. In an application to an insulation film for electronic devices, when a property to sufficiently penetrate into fine spaces of a substrate and to make the surface smooth (so-called gap-filling and planarization property) is required, the number average molecular weight of the prepolymer is most preferably within a range of from $1.5 \times 10^3$ to $5 \times 10^4$.

The number average molecular weight of the prepolymer can be controlled by changing the charging ratio of the fluorinated aromatic compound (B) to the sum of the compound (C) and the compound (Y-1) in the method (i). Here, it is preferred that no hydroxyl groups will remain in the prepolymer, since the relative permittivity will thereby be low.

In condensation reaction in the method (i) of the present invention, control of the molecular weight is preferably adjusted within a range where the total molar amount of hydroxyl groups in the compound (C) and the compound (Y-1) will not exceed the molar amount of fluorine atoms reactive with the hydroxyl groups in the fluorinated aromatic compound (B). As a specific example, in a case where the fluorinated aromatic compound (B) functions as a trifunctional compound, it is preferably adjusted within a range where the total molar amount of hydroxyl groups in the compound (C) and the compound (Y-1) will not exceed three times the molar amount of the fluorinated aromatic compound (B). In a case where the fluorinated aromatic compound (B) functions as a bifunctional compound, it is preferably adjusted within a range where the total molar amount of hydroxyl groups in the compound (C) and the compound (Y-1) will not exceed twice the molar amount of the fluorinated aromatic compound (B).

Likewise, in condensation reaction in the method (ii), the number average molecular weight of the prepolymer can be controlled by changing the charging ratio of the compound (C) to the sum of the fluorinated aromatic compound (B) and the compound (Y-2). In the same manner as above, in a case where the fluorinated aromatic compound (B) functions as a trifunctional compound and the compound (Y-2) functions as a monofunctional compound, control of the molecular weight is preferably adjusted within a range where the total molar amount of hydroxyl groups in the compound (C) will not exceed the sum of three times the molar amount of the fluorinated aromatic compound (B) and the molar amount of the compound (Y-2). Further, in a case where the fluorinated aromatic compound (B) functions as a trifunctional compound and the compound (Y-2) functions as a bifunctional compound, it is preferably adjusted within a range where the total molar amount of hydroxyl groups in the compound (C) will not exceed the sum of three times the molar amount of the fluorinated aromatic compound (B) and twice the total molar amount of the compound (Y-2). In a case where the fluorinated aromatic compound (B) functions as a bifunctional compound and the compound (Y-2) functions as a monofunctional compound, it is preferably adjusted within a range where the total molar amount of hydroxyl groups in the compound (C) will not exceed the sum of twice the molar amount of the fluorinated aromatic compound (B) and the molar amount of the compound (Y-2). Further, in a case where the fluorinated aromatic compound (B) functions as a bifunctional compound and the compound (Y-2) functions as a bifunctional compound, it is preferably adjusted within a range where the total molar amount of hydroxyl groups in the compound (C) will not exceed twice the total molar amount of the fluorinated aromatic compound (B) and the compound (Y-2).

Further, in the method (ii), in a case where the reaction rates of the fluorinated aromatic compound (B) and the compound (Y-2) are different, the molecular weight or composition of the prepolymer thereby obtainable may sometimes be different depending upon the order of addition. For example, in a case where the reaction rates to phenoxy groups derived from the phenolic hydroxyl group of the compound (C) are (B)>(Y-2), if the fluorinated aromatic compound (B) and the compound (Y-2) are charged simultaneously, all phenoxy groups may be consumed by the fluorinated aromatic compound (B) before all the compound (Y-2) is consumed, whereby a non-reacted compound (Y-2) may remain. In such a case, in order to increase the reaction rate of the compound (Y-2), it is preferred that after charging the compound (Y-2) first, the fluorinated aromatic compound (B) is charged. However, in such a method, variation in the composition of the resulting prepolymer chains tends to be large. When it is required to minimize such variation in the composition of the resulting prepolymer chains, it is preferred to carry out the production by charging all at once.

In the method (i), the amount of the compound (C) to be used is preferably from 0.1 to 1 time, more preferably from 0.3 to 0.6 time, in a molar ratio to the fluorinated aromatic compound (B), and the amount of the compound (Y-1) to be used is preferably from 0.1 to 2 times, more preferably from 0.2 to 1.5 times, in a molar ratio to the fluorinated aromatic compound (B). In the method (ii), the amount of the compound (C) to be used is preferably from 0.5 to 2 times, more preferably from 0.6 to 1.5 times, in a molar ratio to the fluorinated aromatic compound (B), and the amount of the compound (Y-2) is preferably from 0.1 to 2 times, more preferably from 0.2 to 1.5 times, in a molar ratio to the fluorinated aromatic compound (B). When the respective values are in such ranges, the resulting prepolymer will have a low dielectric constant and high heat resistance, such being desirable.

The prepolymer of the present invention may be produced by suitably selecting the method (i) or (ii) to obtain a prepolymer capable of obtaining a cured product having desired physical properties, depending upon the physical properties such as the heat resistance, relative permittivity, birefringence, and flexibility, of the cured product obtainable after the curing. For example, in a case where the method (ii) is used, the relative permittivity and birefringence values of a cured product obtainable by curing the prepolymer thus produced usually tend to be low. Accordingly, to obtain a cured product having low relative permittivity and birefringence values, it is preferred to produce the prepolymer by the method (ii).

In the present invention, in a case where the heat resistance of a cured product of the prepolymer is inadequate or the coating or film made of the cured product is brittle, a co-condensation component may be incorporated at the time of the production of the prepolymer to improve the heat resistance or flexibility of the cured product.

Such a co-condensation component may, for example, be a compound (Z) having two phenolic hydroxyl groups other than (Y-1) in order to improve the flexibility of the cured film.

The compound (Z) having two phenolic hydroxyl groups may be a bifunctional phenol such as dihydroxybenzene, dihydroxybiphenyl, dihydroxyterphenyl, dihydroxynaphthalene, dihydroxyanthracene, dihydroxyphenanthracene, dihydroxy-9,9-diphenylfluororene, dihydroxydibenzofuran, dihydroxydiphenyl ether, dihydroxydiphenyl thioether, dihydroxybenzophenone, dihydroxy-2,2-diphenylpropane, dihydroxy-2,2-diphenylhexafluoropropane or dihydroxybinaphthyl. They may be used alone or in combination as a mixture of two or more of them.

After the condensation reaction or after formed into a solution, the prepolymer of the present invention is purified by a method such as neutralization, reprecipitation, extraction or filtration. The purification is preferably carried out in a state where the polar solvent preferably used during the production, is present, or in a state as dissolved or dispersed in the after-mentioned solvent, since the efficiency is thereby good. In an application as an insulation film for electronic devices or an insulation film for multilayer wiring boards, a metal such as potassium or sodium as a condensation reaction catalyst and free halogen atoms are likely to cause operation failure of a transistor or corrosion of wiring, and accordingly, it is preferred to sufficiently carry out the purification.

From the prepolymer of the present invention, a cured product can be obtained by having its cross-linking reaction proceed to cure it. The present invention provides a cured product by curing such a prepolymer. The cured product may have any shape. It is preferably a cured coating (a cured film) formed from a coating composition containing the after-mentioned solvent, since the cross-linking reaction will uniformly proceed and a homogeneous cured product will be obtained. In the following description, the present invention will be described in detail with reference to a cured film as a preferred form.

The prepolymer of the present invention can be used suitably as a material for a coating composition to be used for coating on a suitable substrate and forming a film by having its condensation reaction proceed to cure it. Thus, the present invention provides a coating composition comprising the above prepolymer and a solvent.

The coating composition of the present invention can be obtained, for example, by dissolving or dispersing the above-mentioned prepolymer of the present invention in a solvent.

The solvent to be used for the coating composition of the present invention is not particularly limited so long as the prepolymer of the present invention and a catalyst or additives which may be added as the case requires, can be dissolved or dispersed therein, and a cured film having a desired thickness, uniformity or gap-filling and planarization property, can be obtained by a desired method. For example, an aromatic hydrocarbon, an aprotic polar solvent, a ketone, an ester, an ether or a halogenated hydrocarbon may be mentioned. The solvent for the coating composition may be the same or different from the solvent for the reaction for the production of the above-described prepolymer. If a different solvent is to be used, the prepolymer may once be recovered from the reaction solution by e.g. a reprecipitation method and then dissolved or dispersed in a different solvent, or solvent substitution may be carried out by using a known method such as an evaporation method or an ultrafiltration method.

The aromatic hydrocarbon may, for example, be benzene, toluene, xylene, ethylbenzene, cumene, mesitylene, tetralin or methylnaphthalene.

The aprotic polar solvent may, for example, be N-methylpyrrolidone, N,N-dimethylformamide, N,N-dimethylacetamide, γ-butylolactone or dimethyl sulfoxide.

The ketone may, for example, be cyclopentanone, cyclohexanone, cycloheptanone, cyclooctanone or ethyl amyl ketone.

The ether may, for example, be tetrahydrofuran, pyran, dioxane, dimethoxyethane, diethoxyethane, diphenyl ether, anisole, phenetole, diglyme or triglyme.

The ester may, for example, be ethyl lactate, methyl benzoate, ethyl benzoate, butyl benzoate, benzyl benzoate, methyl cellsolve acetate, ethyl cellsolve acetate, propylene glycol monomethyl ether acetate, propylene glycol monopropyl ether acetate, propylene glycol monobutyl ether acetate or propylene glycol monoethyl ether acetate.

The halogenated hydrocarbon may, for example, be carbon tetrachloride, chloroform, methylene chloride, tetrachloroethylene, chlorobenzene or dichlorobenzene.

With respect to the coating composition of the present invention, the concentration of the prepolymer in the composition is preferably from 1 to 50 mass %, more preferably from 5 to 30 mass %. This coating composition may contain, in addition to the prepolymer and the solvent, at least one type of additives selected from various additives well known in the coating field such as plasticizers and thickeners. Further, to form a film or coating having pores, the after-mentioned hollow bodies or a material which can be removed after forming a thin film may, for example, be suitably incorporated.

In a case where the prepolymer of the present invention contains a low molecular weight substance having a vapor pressure, to prevent its evaporation during the baking, a part of the polymerizable double bonds (A) may preliminarily be reacted in a solution. As such a method, heating is preferred. The heating conditions are preferably from 50° C. to 250° C. for from 1 to 50 hours, more preferably from 70 to 200° C. for from 1 to 20 hours. The reaction ratio in the solution of the polymerizable double bonds is preferably less than 50%, more preferably less than 30%, with a view to preventing gellation of the prepolymer in the solution.

The coating composition of the present invention is applied on a suitable substrate surface to form a wet film, and then, after or at the same time as removing the solvent by e.g. evaporation, curing treatment is applied to let the polymerizable double bonds (A) in the prepolymer undergo a crosslinking reaction to form a cured film which is applicable as an insulation film and an optical transmission device. As such a method for forming the wet film, it is preferred to employ a coating method. For example, a known coating method such as a spin coating method, a dip coating method, a spray coating method, a die-coating method, a bar coating method, a doctor coating method, an extrusion coating method, a scan coating method, a brush coating method or a potting method may be mentioned. In a case where it is used as an insulation film for electronic devices, a spin coating method or a scanning coating method is preferred from the viewpoint of uniformity of the film thickness.

After applying this coating composition, baking (heating) is carried out to evaporate the solvent and to cure the prepolymer by a crosslinking or chain extension reaction. The polymerizable double bonds (A) of this prepolymer do not substantially react in a solution and will undergo a crosslinking reaction in the heating (baking) step after the film formation. The heating conditions are preferably from 100 to 250° C. for from about 1 to 120 minutes, more preferably from 150 to 200° C. for from about 2 to 60 minutes.

The heating equipment is preferably a hot plate, an oven or a furnace. The heating atmosphere may, for example, be an atmosphere of an inert gas such as nitrogen or argon, air, oxygen or reduced pressure. The heating atmosphere is preferably an inert gas atmosphere or a reduced pressure atmosphere. In order to secure the surface smoothness of the thin film or to improve fine space gap-filling properties of the thin film, it is preferred to add a prebaking step at a temperature of from about 50 to 250° C. or to carry out the heating step as divided into a plurality of stages. The reaction ratio of the polymerizable double bonds (A) in the cured film is preferably from 30 to 100%. When the reaction is ratio is at least 30%, the heat resistance and chemical resistance of the cured film will be good. From such a viewpoint, the reaction ratio is more preferably at least 50%, most preferably at least 70%.

The thickness of the wet film to be formed by the coating composition can be optionally set to match the shape of the desired cured film to be produced. For example, for the purpose of producing an insulation layer or film, it is preferred to form a wet film having a thickness of from about 0.01 to 500 µm on a substrate, and a thickness of from 0.1 to 300 µm is more preferred.

The cured film obtainable from the coating composition of the present invention may be peeled from the substrate and used as a film itself, or may be used as an insulation film or the like in a state as bonded on the substrate. In the latter case, in order to improve the adhesion between the cured film and the substrate, the adhesion promoter may be used. As such an adhesion promoter, a silane coupling agent, a titanate coupling agent or an aluminum coupling agent may be mentioned, and particularly preferred is a silane coupling agent such as a vinylsilane, an epoxysilane or an aminosilane. The vinylsilane may, for example, be vinyl trimethoxysilane or vinyl triethoxysilane. The aminosilane may, for example, be an aliphatic aminosilane such as 3-aminopropylmethyldiethoxysilane or 3-aminopropyltriethoxysilane, or an aromatic group-containing aminosilane such as aminophenyltrimethoxysilane, aminophenyltriethoxysilane or N-phenyl-3-aminopropyltrimethoxysilane.

As a method for applying the adhesion promoter, it is preferred to employ a method of treating the substrate with the adhesion promoter prior to coating with the coating composition, or a method of adding the adhesion promoter to the coating composition. As the method of treating the substrate with the adhesion promoter, in the case of an aminosilane, a method of spin-coating the substrate with a 0.01 to 3 mass % solution in an alcohol. As such an alcohol, methanol, ethanol or isopropyl alcohol is preferred. In the method of adding the adhesion promoter in the prepolymer solution, the amount of the adhesion promoter to be added is preferably from 0.05 to 10 parts by mass, more preferably from 0.1 to 5 parts by mass, per 100 parts by mass of the contained prepolymer. If the amount of the adhesion promoter to be added is small, the effect for improving the adhesion tends to be inadequate, and if it is too large, the electrical properties or heat resistance tends to decrease.

The cured product produced by using the prepolymer of the present invention may be used for e.g. photoresists, optical waveguides, non-linear optical materials, optical adhesives, covering materials, electronic components, encapsulation materials, over coating agents, transparent film materials, or heat resistance/low moisture absorbing film materials. Particularly preferred is an application to optical transmission devices (particularly insulation films for liquid crystal substrates). The present invention provides an electric or electronic component and an optical transmission device, having the cured film formed by using the coating composition comprising the above prepolymer and a solvent.

Among electric or electronic components to which the cured film of the present invention is applicable, as electronic devices, a discreet semiconductor such as a diode, a transistor, a compound semiconductor, a thermistor, a varistor or a thyristor, a memory device such as DRAM (dynamic random access memory), SRAM (static random access memory), EPROM (erasable programmable read only memory), mask ROM (mask read only memory), EEPROM (electrical erasable programmable read only memory) or a flash memory, a logic device such as a microprocessor, DSP or ASIC, an integrated circuit device such as a compound semiconductor represented by MMIC (monolithic microwave integrated circuit), a hybrid integrated circuit (hybrid IC), an optical semiconductor such as a light emitting diode or a laser diode, a photoelectric conversion device such as a charge-coupled device, and a display device such as an amorphous silicon TFT (thin film transistor) or a polysilicon TFT, may, for example, be mentioned.

Among the electric or electronic components to which the insulation film of the present invention is applicable, the multilayer wiring boards may be various substrates to mount electronic devices, etc. thereon and may, for example, be high density wiring boards such as a printed circuit board, a buildup wiring board, a MCM substrate, a transparent plastic substrate and an interposer.

As an insulation film in such electric or electronic components, a buffer coating film, a passivation film, an interlayer insulation film, an insulation film for redistribution or an alpha ray shielding film may, for example, be mentioned.

The optical transmission device is meant for a component which has a function to let light pass therethrough for transmission, branching, amplification or optical branching/multiplexing. The optical transmission device may, for example, be an optical fiber, a rod lens, an optical waveguide, an optical branching device, an optical multiplexer, an optical branching filter, an optical attenuator, an optical switch, an optical isolator, an optical transmitter module, an optical receiver module, a coupler, a deflector, a light wavelength conversion device, a light modulation device, an optical integrated circuit, a photoelectric hybrid circuit or substrate, an optical pickup device, LED (light emitting diode), LD (laser diode), a plastic lens itself or an optical transmission portion thereof.

The wavelength of light to be used for the optical transmission device is preferably within a range of from 400 to 1,600 nm. Within such a range, 405 nm band, 650 nm band, 850 nm band, 1,300 nm band or 1,550 nm band is preferred, since a component for e.g. a laser is thereby readily available.

In a case where the above optical transmission device is used as a so-called electro-optic (EO) material to modulate and control optical transmission by an external electric field to carry out phase change, directional coupling, mode conversion or change of the course of guided light, it is preferred to have a non-linear optical dye doped. As such a non-linear optical dye, a compound having a long n-conjugated system and having a push-pull type electron structure having an electron donating group and an electron attracting group, is preferred. As a specific example, an azobenzene dye or a polyene dye may, for example, be mentioned.

In an application to an insulation film for electronic devices or an insulation film for multilayer wiring boards employing the cured film formed from the prepolymer of the present invention, in order to obtain an insulation film having a lower relative permittivity, it is preferred to provide pores in the insulation film of the present invention. As a method for introducing such pores, the following method (a) or (b) may, for example, be mentioned.

(a) A method wherein in the coating composition of the present invention, the prepolymer of the present invention and a polymer having a low heat decomposition temperature (hereinafter referred to as a heat-decomposable polymer) are complexed, and at the time of forming an insulation film, the heat decomposable polymer portion is removed.

(b) A method wherein fine particles are added into the coating composition of the present invention, and the fine particle portions are removed during or after forming the insulation film.

In the method (a), the heat decomposable polymer may, for example, be an aliphatic polyether, an aliphatic polyester, an acrylic polymer or a styrene polymer. The molecular weight of the heat decomposable polymer is preferably from 1,000 to 100,000, more preferably from 1,000 to 50,000. When the molecular weight is within this range, the compatibility with the prepolymer of the present invention can be secured in the coating composition, such being desirable. As a method for complexing the prepolymer of the present invention and the heat decomposable polymer, a method may, for example, be mentioned wherein a coating composition comprising the prepolymer and the heat decomposable polymer will be prepared and applied on a substrate, and then, the solvent is evaporated and heat treatment is carried out to obtain a composite film, or a method wherein the prepolymer and the heat decomposable polymer are complexed by blocking or grafting, and the composite thereby obtained is incorporated to the coating composition. As the method for blocking or grafting, a known method may be employed. For example, a method may be mentioned wherein a heat decomposable polymer having a fluorinated aromatic ring or a phenolic hydroxyl ring at its terminal, is prepared, and it is co-condensed at the time of the condensation reaction for the preparation of the prepolymer. The condensation reaction for the prepolymer will proceed by the reaction mechanism of the above formula (2) or (3), whereby the terminal fluorinated aromatic ring or phenolic hydroxyl group moiety will be bonded to the prepolymer chain. Here, in a case where the heat decomposable polymer has a fluorinated aromatic ring or phenolic hydroxyl group at one terminal, it is possible to obtain a prepolymer having the heat decomposable polymer grafted. In a case where the heat decomposable polymer has a fluorinated aromatic ring or phenolic hydroxyl group at each terminal, it is possible to obtain a block product of the prepolymer and the heat decomposable polymer.

The heat decomposable polymer has a low heat decomposition temperature, and by the heating during the formation of an insulation film, it is selectively decomposed and removed, and the removed portions will be pores. It is possible to control the porosity by the amount of the heat decomposable polymer added to the coating composition, and the amount of the heat decomposable polymer to be added, is usually preferably form 5 to 80 vol %, more preferably from 10 to 70 vol %, based on the prepolymer.

In the method (b), the fine particles to be dispersed in the coating composition of the present invention are preferably inorganic fine particles. As such inorganic fine particles, fine particles of silica, metal, etc. may be mentioned. The fine particles will be dissolved and removed by e.g. acid treatment after the film-forming, so that the removed portions will be pores. It is possible to control the porosity by the amount of the fine particles to be added. The amount of the fine particles to be added is usually preferably from 5 to 80 vol %, more preferably from 10 to 70 vol %, based on the prepolymer.

The insulation film of the present invention may also be preferably complexed with another film. For example, in a case where it is used as a passivation film for a semiconductor device or as an interlayer insulation film for a semiconductor device, it is preferred to form an inorganic film as a lower layer and/or upper layer of the insulation film of the present invention.

The inorganic film may be formed by a normal pressure, reduced pressure or plasma chemical vapor deposition (CVD) method or a coating method and may, for example, be phosphorus and/or boron doped, as the case requires, silicon oxide film so-called PSG film or BPSG film, a silicon oxide film, a silicon nitride film, a silicon oxide nitride film, a SiOC film, or a spin-on-glass (SOG) film.

By forming an inorganic film between the metal wiring and the insulation film of the present invention, it is possible to obtain effects to prevent peeling of the metal wiring and to facilitate etching for e.g. a damascene structure. It is preferred to form the inorganic film on the insulation film after partially removing the insulation film of the present invention by an etch back process or CMP (chemical mechanical polishing) process.

In a case where the adhesion between the insulation film and the inorganic film is inadequate when the inorganic film is formed on the insulation film of the present invention or film reduction takes place at the time of forming the inorganic film, it is preferred to apply the following method (I) or (II).

(I) A method of forming a multilayer inorganic film: In a case where a silicon oxide film is formed by a plasma CVD process, film reduction may occur depending upon the gas composition to be used. In such a case, firstly, a thin inorganic film which undergoes no film reduction, such as a silicon nitride film or a normal pressure CVD-silicon oxide film, is formed. Then, using this thin film as a barrier layer, a silicon oxide film is formed.

(II) A method of treating the insulation film of the present invention with energy rays: There is a case where the interface adhesion in the inorganic film and the insulation film of the present invention can be improved by treatment with energy rays. Such energy ray treatment may, for example, be treatment by means of electromagnetic waves in a broad sense including light, such as ultraviolet irradiation, laser irradiation or microwave irradiation, or treatment by means of electron rays such as electron irradiation, glow discharge treatment, corona discharge treatment or plasma treatment.

Among them, as a treating method suitable for a mass production process for semiconductor devices, UV irradiation, laser irradiation, corona discharge treatment or plasma treatment may be mentioned.

Plasma treatment is more preferred since a damage to semiconductor device is thereby little. The apparatus for the plasma treatment is not particularly limited so long as a desired gas can be introduced into the apparatus and an electric field can be applied, and a commercially available barrel type or parallel flat plate type plasma generating apparatus may suitably be used. The gas to be introduced into the plasma apparatus is not particularly limited so long as it is capable of effectively activating the surface, and argon, helium, nitrogen, oxygen or a mixed gas thereof may, for example, be mentioned. Further, as a gas which is capable of activating the surface of the cured film of the prepolymer and which brings about substantially no film reduction, a mixed gas of nitrogen and oxygen, or a nitrogen gas may be mentioned.

EXAMPLES

The present invention will be described in further detail with reference to the following Examples and Comparative Examples. However, the present invention is by no means thereby restricted. Among the following Examples, Examples 1 to 7 are Examples of the present invention, and Example 8 is a Comparative Example. Examples 1 to 8 are directed to preparation of a prepolymer for evaluation of the basic properties of a cured film, and Example 9 is directed to evaluation of the adhesive property of the cured film. Further, to evaluate the basic properties of the prepolymer in each of Examples 1 to 8 and the cured film made of the prepolymer, the molecular weight, the relative permittivity and the transmittance were measured by the following methods.

Molecular Weight

A vacuum dried prepolymer powder was subjected to a gel permeation chromatography method (GPC) to obtain a number average molecular weight calculated as polystyrene. Tetrahydrofuran was used as the carrier solvent.

Relative Permittivity

A vacuum dried prepolymer powder was dissolved in cyclohexanone to obtain a 20 mass % solution, which was filtered through a polytetrafluoroethylene (PTFE) filter having a pore diameter of 0.5 μm. Using the obtained solution, a cured film having a thickness of about 1 μm was formed by a spin coating method on a 4 inch silicon wafer. The spinning conditions were 1,000 to 3,000 revolutions per minute for 30 seconds, and after prebaking by a hot plate at 100° C. for 90 seconds and 200° C. for 90 seconds, final baking was carried out in a nitrogen atmosphere in a vertical furnace at 250° C. for one hour. Then, a CV measurement was carried out by a mercury prober (SSM-495, manufactured by SSM) to obtain a relative permittivity at 1 MHz. As the thickness of the cured film, a value obtained by a spectroellipsometer was used.

Transmittance

A vacuum dried prepolymer powder was dissolved in cyclohexanone to obtain a 30 mass % solution, which was filtered through a PTFE filter having a pore diameter of 0.5 μm. Using the obtained solution, a cured film having a thickness of about 3 μm was formed by a spin coating method on a glass substrate. The spinning conditions were 1,000 to 3,000 revolutions per minute for 30 seconds, and after prebaking by a hot plate at 100° C. for 90 seconds and 200° C. for 90 seconds, final baking was carried out in a nitrogen atmosphere in a vertical furnace at 250° C. for one hour. Using the formed thin film formed on the glass substrate, the light transmittance at a wavelength of from 400 to 800 nm was measured by a spectrophotometer (UV-310, manufactured by Shimadzu Corporation).

Crosslinking Temperature

A vacuum dried prepolymer powder as a sample was subjected to differential thermal analysis using a differential thermal analyzer (TG-DTA2000S, manufactured by Macscience). Specifically, measurement was carried out by raising the temperature from 40° C. to 450° C. in nitrogen atmosphere at a heating rate of 10° C./min, and the temperature at the peak of an exothermic curve accompanying the crosslinking reaction was regarded as the crosslinking temperature.

Example 1

Into a 100 mL glass four-necked flask equipped with a Dimroth condenser, a thermocouple thermometer and a mechanical stirrer, pentafluorostyrene (1.0 g), 1,1,1-tris(4-hydroxyphenyl)ethane (2.4 g) and dimethylacetamide (hereinafter referred to as DMAc) (31.1 g) were charged. The mixture was heated on an oil bath with heating, and when the liquid temperature became 60° C., sodium carbonate (3.8 g) was quickly added, followed by heating at 60° C. for 24 hours with continuous stirring. Then, a solution having perfluoro-1,3,5-triphenylbenzene (5.0 g) dissolved in DMAc (45.0 g) was added, followed by further heating at 60° C. for 24 hours, and then the reaction solution was cooled to room temperature. The reaction solution was gradually added dropwise to 0.5 N aqueous hydrochloric acid solution (about 200 ml) with vigorous stirring for reprecipitation. The precipitate was collected by filtration, washed twice with pure water and vacuum dried at 60° C. for 24 hours to obtain a white powdery prepolymer (6.9 g).

The obtained polymer had ether bonds and vinyl groups as the polymerizable double bonds (A), and had a molecular weight of 5,300. Further, the crosslinking temperature of the prepolymer was 145° C. A cured film formed from the prepolymer by the above-described method had a relative permittivity of 2.4 and light transmittances at 400 nm, 600 nm and 800 nm of 98%, 99.5% and 99.5%, respectively.

Example 2

Into a 100 mL glass four-necked flask equipped with a Dimroth condenser, a thermocouple thermometer and a mechanical stirrer, pentafluorostyrene (2.2 g), 1,1,1-tris(4-hydroxyphenyl)ethane (3.3 g) and DMAc (49.2 g) were charged. The mixture was heated on an oil bath with stirring, and when the liquid temperature became 60° C., sodium carbonate (5.1 g) was quickly added, followed by heating at 60° C. for 24 hours with continuous stirring. Then, a solution having perfluorobiphenyl (4.0 g) dissolved in DMAc (36.0 g) was added, followed by further heating at 60° C. for 17 hours, and then the reaction solution was cooled to room temperature. The reaction solution was gradually added dropwise to 0.5 N aqueous hydrochloric acid solution (about 300 mL) with vigorous stirring for reprecipitation. The precipitate was collected by filtration, washed twice with pure water and vacuum dried at 60° C. for 12 hours to obtain a white powdery prepolymer (7.5 g).

The obtained prepolymer had ether bonds and vinyl groups. The same evaluation as in Example 1 was carried out, and results of evaluation of basic properties are shown in Table 1.

Example 3

Into a 100 mL glass four-necked flask equipped with a Dimroth condenser, a thermocouple thermometer and a mechanical stirrer, pentafluorostyrene (2.4 g), 1,1,1-tris(4-hydroxyphenyl)ethane (3.2 g) and DMAc (50.8 g) were charged. The mixture was heated on an oil bath with stirring, and when the liquid temperature became 60° C., sodium carbonate (5.0 g) was quickly added, followed by heating at 60° C. for 24 hours with continuous stirring. Then, a solution having perfluorobiphenyl (3.5 g) dissolved in DMAc (31.5 g) was added, followed by further heating at 60° C. for 17 hours, and then the reaction solution was cooled to room temperature. The reaction solution was gradually added dropwise to 0.5 N aqueous hydrochloric acid solution (about 300 mL) with vigorous stirring for reprecipitation. The precipitate was collected by filtration, washed twice with pure water and vacuum dried at 60° C. for 12 hours to obtain a white powdery prepolymer (7.0 g).

The obtained prepolymer had ether bonds and vinyl groups. The same evaluation as in Example 1 was carried out, and results of evaluation of basic properties are shown in Table 1.

Example 4

Into a 300 mL glass four-necked flask equipped with a Dimroth condenser, a thermocouple thermometer and a mechanical stirrer, pentafluorostyrene (2.7 g), 1,1,1-tris(4-hydroxyphenyl)ethane (9.9 g) and DMAc (114.2 g) were charged. The mixture was heated on an oil bath with stirring, and when the liquid temperature became 60° C., sodium carbonate (15.5 g) was quickly added, followed by heating at 60° C. for 24 hours with continuous stirring. Then, a solution having perfluorotoluene (10.0 g) dissolved in DMAc (90.0 g) was added, followed by further heating at 60° C. for 24 hours, and then the reaction solution was cooled to room temperature. The reaction solution was gradually added dropwise to 0.5 N aqueous hydrochloric acid solution (about 600 mL) with vigorous stirring for reprecipitation. The precipitate was collected by filtration, washed twice with pure water and vacuum dried at 60° C. for 12 hours to obtain a white powdery prepolymer (17.9 g).

The obtained prepolymer had ether bonds and vinyl groups. The same evaluation as in Example 1 was carried out, and results of evaluation of basic properties are shown in Table 1.

Example 5

Into a 100 mL glass four-necked flask equipped with a Dimroth condenser, a thermocouple thermometer and a mechanical stirrer, pentafluorostyrene (1.0 g), 1,1,2,2-tetrakis(4-hydroxyphenyl)ethane (2.3 g) and DMAc (30.1 g) were charged. The mixture was heated on an oil bath with stirring, and when the liquid temperature became 60° C., sodium carbonate (2.8 g) was quickly added, followed by heating at 60° C. for 24 hours with continuous stirring. Then, a solution having perfluoro-1,3,5-triphenylbenzene (5.0 g) dissolved in DMAc (45.0 g) was added, followed by further heating at 60° C. for 24 hours, and then the reaction solution was cooled to room temperature. The reaction solution was gradually added dropwise to 0.5 N aqueous hydrochloric acid solution (about 250 mL) with vigorous stirring for reprecipitation. The precipitate was collected by filtration, washed twice with pure water and vacuum dried at 60° C. for 12 hours to obtain a white powdery prepolymer (7.0 g).

The obtained prepolymer had ether bonds and vinyl groups. The same evaluation as in Example 1 was carried out, and results of evaluation of basic properties are shown in Table 1.

Example 6

Into a 100 mL glass four-necked flask equipped with a Dimroth condenser, a thermocouple thermometer and a mechanical stirrer, pentafluorostyrene (2.2 g), 1,1,2,2-tetrakis(4-hydroxyphenyl)ethane (3.2 g) and DMAc (48.1 g) were charged. The mixture was heated on an oil bath with stirring, and when the liquid temperature became 60° C., sodium carbonate (3.8 g) was quickly added, followed by heating at 60° C. for 24 hours with continuous stirring. Then, a solution having perfluorobiphenyl (4.0 g) dissolved in DMAc (36.0 g) was added, followed by further heating at 60° C. for 24 hours, and then the reaction solution was cooled to room temperature. The reaction solution was gradually added dropwise to 0.5 N aqueous hydrochloric acid solution (about 250 mL) with vigorous stirring for reprecipitation. The precipitate was collected by filtration, washed twice with pure water and vacuum dried at 60° C. for 12 hours to obtain a white powdery prepolymer (7.5 g).

The obtained prepolymer had ether bonds and vinyl groups. The same evaluation as in Example 1 was carried out, and results of evaluation of basic properties are shown in Table 1.

Example 7

Into a 100 mL glass four-necked flask equipped with a Dimroth condenser, a thermocouple thermometer and a mechanical stirrer, pentafluorostyrene (3.0 g), 1,1,2,2-tetrakis(4-hydroxyphenyl)ethane (3.9 g) and DMAc (61.6 g) were charged. The mixture was heated on an oil bath with heating, and when the liquid temperature became 60° C., sodium carbonate (4.6 g) was quickly added, followed by heating at 60° C. for 24 hours with continuous stirring. Then, a solution having pentafluorotoluene (3.0 g) dissolved in DMAc (27.0 g) was added, followed by further heating at 60° C. for 24 hours, and then the reaction solution was cooled to room temperature. The reaction solution was gradually added dropwise to 0.5 N aqueous hydrochloric acid solution (about 250 mL) with vigorous stirring for reprecipitation. The precipitate was collected by filtration, washed twice with pure water and vacuum dried at 60° C. for 12 hours to obtain a white powdery prepolymer (7.6 g).

The obtained prepolymer had ether bonds and vinyl groups. The same evaluation as in Example 1 was carried out, and results of evaluation of basic properties are shown in Table 1.

Example 8

Into a 10 L glass four-necked flask equipped with a Dimroth condenser, a thermocouple thermometer and a mechanical stirrer, perfluorobiphenyl (450 g), pentafluorophenyl acetylene (155 g), 1,3,5-trihydroxybenzene (130 g), powdery molecular sieves 4A (600 g) and DMAc (6,620 g) were charged. The mixture was heated on an oil bath with stirring, and when the liquid temperature became 60° C., sodium carbonate (600 g) was quickly added, followed by heating at 60° C. for 45 hours with continuous stirring, and then the reaction solution was cooled to room temperature. The reaction solution was gradually added dropwise to 0.5 N aqueous hydrochloric acid solution (about 27 L) with vigorous stirring for reprecipitation. The precipitate was collected by filtration, washed twice with pure water and vacuum dried at 60° C. for 12 hours to obtain a white powdery prepolymer (620 g).

The obtained prepolymer had ether bonds and ethynyl groups. Further, the crosslinking temperature of the prepolymer was 235° C. The same evaluation as in Example 1 was carried out, and results of evaluation of basic properties are shown in Table 1.

TABLE 1

| EX. | Molecular weight | Relative permittivity | Light transmittance | | |
|---|---|---|---|---|---|
| | | | 400 nm | 600 nm | 800 nm |
| 1 | 5,300 | 2.4 | 98% | 99.5% | 99.5% |
| 2 | 6,500 | 2.5 | 98% | 99.5% | 99.5% |
| 3 | 4,200 | 2.5 | 98% | 99.5% | 99.5% |
| 4 | 3,600 | 2.5 | 98% | 99.5% | 99.5% |
| 5 | 6,700 | 2.5 | 98% | 99.5% | 99.5% |
| 6 | 5,800 | 2.6 | 98% | 99.5% | 99.5% |
| 7 | 4,800 | 2.6 | 98% | 99.5% | 99.5% |
| 8 | 9,000 | 2.5 | 52% | 98% | 99% |

From the results in Table 1, the prepolymers of the present invention were found to have both high transparency and low relative permittivity.

Example 9

A part of a 20 mass % solution of the prepolymer obtained in Example 2 in cyclohexanone (hereinafter referred to as a solution 1) was taken out, and 3-aminopropyltriethoxysilane was added in an amount of 2 parts by mass per 100 parts by mass of the prepolymer to obtain a solution 1-1. Further, instead of 3-aminopropyltriethoxysilane, triethoxyvinylsilane was added in an amount of 2 parts by mass per 100 parts by mass of the prepolymer to obtain a solution 1-2.

Then, on silicon wafers, the solution 1, the solution 1-1 and the solution 1-2 were applied by spin coating to form wet films, followed by heating to prepare cured films. The rotational speed of the spin coating was adjusting so that the wet film thickness became 500 nm, and after prebaking by a hotplate at 100° C. for 90 seconds and at 200° C. for 90 seconds, final baking was carried out in a nitrogen atmosphere in a vertical furnace at 250° C. for one hour. These samples were subjected to a pressure cooker test (121° C., relative humidity of 100%, 4 hours) in a chamber manufactured by ETAC, and then the adhesive properties of the cured films with the substrate were evaluated by the cross cut tape peel test as disclosed in JIS D0202.

At least 80% of cross cut sections of the cured film obtained from the solution 1 were peeled. Whereas, no peeling was observed with respect to cross cut sections of the cured films obtained from the solutions 1-1 and 1-2. From this Example, an adhesion promoter such as an aminosilane or a vinylsilane was found to be effective for the improvement of the adhesive property of the cured film.

Example 10

A 30 mass % solution obtained by dissolving the prepolymer obtained in Example 2 dissolved in cyclohexanone was subjected to filtration through a PTFE filter with a pore diameter of 0.5 μm. The obtained solution was applied to a silicon wafer by a spin coating method to form a thin film with a thickness of about 3 μm. After prebaking by a hotplate at 100° C. for 90 seconds and at 200° C. for 90 seconds, final baking was carried out in a nitrogen atmosphere in a vertical furnace at 250° C. for one hour. The obtained film was dipped in a mixed solution of DMSO/monoethanolamine (concentration: 7/3 by the mass ratio) and heated at 80° C. for 6 minutes. It was confirmed that the outer appearance and the thickness of the film were not changed.

Example 11

A 30 mass % solution obtained by dissolving the prepolymer obtained in Example 2 in cyclohexanone was subjected to filtration through a PTFE filter with a pore diameter of 0.5 μm. The obtained solution was applied to a silicon wafer by a spin coating method to form a thin membrane of about 3 μm. After prebaking by a hotplate at 100° C. for 90 seconds and at 200° C. for 90 seconds, final baking was carried out in a nitrogen atmosphere in a vertical furnace at 250° C. for one hour. Sputtering of ITO was applied to the obtained film under conditions of sputtering pressure: 0.3 Pa ($2 \times 10^{-3}$ Torr), argon/oxygen gas mixture (mixing volume ratio: $Ar/O_2$=99.5/0.5), substrate temperature: 200° C. for 94 seconds. It was confirmed that the film had no abnormality in the outer appearance.

INDUSTRIAL APPLICABILITY

A cured film formed by curing the crosslinkable fluorinated aromatic prepolymer of the present invention has all of high transparency, a low relative permittivity, high heat resistance, low birefringence and high flexibility and thus is useful as an insulation film for electric or electronic components or as an optical transmission device.

The entire disclosure of Japanese Patent Application No. 2005-184611 filed on Jun. 24, 2005 including specification, claims, drawings and summary is incorporated herein by reference in its entirety.

What is claimed is:

1. A crosslinkable fluorinated aromatic prepolymer which is obtained by subjecting either one or both of a compound (Y-1) having a polymerizable double bond (A) and a phenolic hydroxyl group and a compound (Y-2) having a polymerizable double bond (A) and a fluorinated aromatic ring, to a condensation reaction in the presence of a HF-removing agent, with a fluorinated aromatic compound (B) represented by the following formula (1):

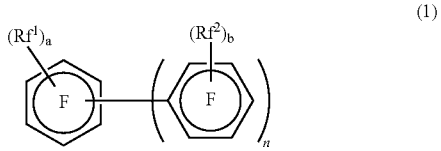

(wherein n is an integer of from 0 to 3, each of a and b which are independent of each other, is an integer of from 0 to 3, each of $Rf^1$ and $Rf^2$ which may be the same or different from each other, is a fluorinated alkyl group having at most 8 carbon atoms, and F in the aromatic ring represents that hydrogen atoms of the aromatic ring are all substituted by fluorine atoms), and a compound (C) having at least 3 phenolic hydroxyl groups, the respective phenolic hydroxyl groups not being present in the same aromatic ring, and which has polymerizable double bonds (A) and ether bonds and has a number average molecular weight of from $1\times10^3$ to $5\times10^5$, wherein a cured film having a thickness of about 3 μm on a glass substrate, formed from a wet film of a coating composition comprising said prepolymer and a solvent on the substrate, removing the solvent and curing, exhibits a light transmittance at a wavelength of 400 nm of at least 98%.

2. The crosslinkable fluorinated aromatic prepolymer according to claim 1, wherein the compound (Y-1) is present and is 4-hydroxystyrene and/or bis(phenylethenyl)dihydroxybiphenyl.

3. The crosslinkable fluorinated aromatic prepolymer according to claim 1, wherein the compound (Y-2) is present and is at least one member selected from the group consisting of pentafluorostyrene, pentafluorobenzyl acrylate, pentafluorobenzyl methacrylate, pentafluorophenyl acrylate, pentafluorophenyl methacrylate, perfluorostyrene, pentafluorophenyl trifluorovinyl ether and 3-(pentafluorophenyl)pentafluoro-1-propene.

4. The crosslinkable fluorinated aromatic prepolymer according to claim 1, wherein the fluorinated aromatic compound (B) is at least one member selected from the group consisting of perfluorobenzene, perfluorotoluene, perfluoroxylene, perfluorobiphenyl, perfluoroterphenyl, perfluoro(1,3,5- or 1,2,4-)triphenylbenzene and perfluoroquaterphenyl.

5. The crosslinkable fluorinated aromatic prepolymer according to claim 1, wherein the compound (C) is at least one member selected from the group consisting of 1,1,1-tris(4-hydroxyphenyl)ethane, 1,2,4- or 1,3,5-tris(4-hydroxyphenyl)benzene and 1,1,2,2-tetrakis(4-hydroxyphenyl)ethane.

6. A cured product formed by curing the crosslinkable fluorinated aromatic prepolymer as defined in claim 1.

7. A coating composition comprising the crosslinkable fluorinated aromatic prepolymer as defined in claim 1, and a solvent.

8. A cured film formed by forming a wet film of a crosslinkable fluorinated aromatic prepolymer on a substrate, by using the coating composition as defined in claim 7, and then, after removing the solvent in the wet film or at the same time as removing the solvent, curing the crosslinkable fluorinated aromatic prepolymer.

9. An electric or electronic component having the cured film as defined in claim 8.

10. An optical transmission device having the cured film as defined in claim 8.

11. The crosslinkable fluorinated aromatic prepolymer according to claim 1, wherein the compound (Y-1) is present and comprises a bis(phenylethenyl)dihydroxybiphenyl.

12. The crosslinkable fluorinated aromatic prepolymer according to claim 11, wherein the bis(phenylethenyl)dihydroxybiphenyl is at least one of 2,2'-bis(phenylethenyl)-5-5'-dihydroxybiphenyl and 2,2'-bis(phenylethenyl)-4,4'-dihydroxybiphenyl.

13. The crosslinkable fluorinated aromatic prepolymer according to claim 1, wherein the number average molecular weight of the prepolymer is within a range of from $1.5\times10^3$ to $5\times10^4$.

14. The crosslinkable fluorinated aromatic prepolymer according to claim 1, wherein the cured film exhibits a light transmittance at 600 nm greater than 98%.

15. The crosslinkable fluorinated aromatic prepolymer according to claim 1, wherein the cured film exhibits a light transmittance at 800 nm greater than 99%.

16. The crosslinkable fluorinated aromatic prepolymer according to claim 1, wherein compound (Y-2) is present and is pentafluorostyrene, and compound (C) is 1,1,1-tris(4-hydroxyphenyl)ethane or 1,1,2,2-tetrakis(4-hydroxyphenyl)ethane.

* * * * *